(12) United States Patent
De Groot et al.

(10) Patent No.: US 6,318,497 B1
(45) Date of Patent: Nov. 20, 2001

(54) PRESSURE-SENSITIVE SWITCH, ITS METHOD OF CALIBRATION AND USE IN A HYDROPHONE ARRAY

(75) Inventors: Thomas J. De Groot, Mattapoisett; Glen Ferguson, Monument Beach; William H. Hulsman, East Falmouth; Robert C. Prescott, North Marshfield; Richard D. Smith, East Falmouth, all of MA (US)

(73) Assignee: Benthos, Inc., North Falmouth, MA (US)

( * ) Notice: Subject to any disclaimer, the term of this patent is extended or adjusted under 35 U.S.C. 154(b) by 0 days.

(21) Appl. No.: 09/571,569

(22) Filed: May 15, 2000

Related U.S. Application Data (60) Provisional application No. 60/185,724, filed on Feb. 29, 2000.

(51) Int. Cl.[7] .................................................. G01V 1/00
(52) U.S. Cl. ........................... 181/110; 84/111; 367/141; 310/337
(58) Field of Search .......................... 181/110, 111, 181/112, 113, 108; 367/166, 163, 14, 157, 159, 188, 141; 310/337

(56) References Cited

U.S. PATENT DOCUMENTS

| | | |
|---|---|---|
| 3,970,878 | 7/1976 | Berglund . |
| 4,906,886 * | 3/1990 | Breimesser et al. ................ 310/334 |
| 5,136,549 | 8/1992 | Berglund . |
| 5,452,268 * | 9/1995 | Bernstein ............................ 367/181 |
| 5,646,470 | 7/1997 | de Groot . |
| 5,675,556 | 10/1997 | Erath et al. . |
| 5,764,595 * | 6/1998 | Power .................................. 367/103 |
| 5,789,844 | 8/1998 | de Groot . |
| 5,815,466 * | 10/1998 | Erath ................................... 367/160 |
| 6,108,274 * | 8/2000 | Pearce ................................. 367/157 |
| 6,151,277 * | 11/2000 | Erath ................................... 367/173 |
| 6,160,763 * | 12/2000 | Cole .................................... 367/173 |

OTHER PUBLICATIONS

IttCanon Specification Sheet For ED Dome Switches, Printed From Website on Feb. 25, 2000.

* cited by examiner

*Primary Examiner*—Robert E. Nappi
*Assistant Examiner*—Kim Lockett
(74) *Attorney, Agent, or Firm*—Francis J. Caufield (57) ABSTRACT

A pressure-sensitive switch comprises a base member having a mounting surface formed of electrically-insulating material; two electrodes mounted on the base member and each having an electrically-conductive contact surface, and a flexible diaphragm having its periphery secured in a fluid-tight manner to the mounting surface with its electrically-conductive central portion overlying the contact surfaces of the electrodes. The diaphragm, which is formed with plural corrugations, is exposed to the external pressure. When the switch is exposed to atmospheric pressure, the central portion of the diaphragm does not touch the contact surfaces of said electrodes, but when the switch is exposed to a super-atmospheric pressure, this central portion is forced into contact with both contact surfaces, thus electrically connecting the two electrodes. This pressure-sensitive switch is especially useful for use with hydrophones, as in seismic streamer cables.

35 Claims, 10 Drawing Sheets

FIG. 11

PRESSURE-SENSITIVE SWITCH, ITS METHOD OF CALIBRATION AND USE IN A HYDROPHONE ARRAY

CROSS REFERENCE TO RELATED APPLICATION

This application is related to U.S. Provisional Patent Application No. 60/185,724 entitled "PRESSURE-SENSITIVE SWITCH, ITS METHOD OF CALIBRATION AND USE IN A HYDROPHONE ARRAY" which was filed on Feb. 29, 2000 and from which priority is claimed. The entire contents of Provisional Application No. 60/185,724 are incorporated herein by reference.

FIELD OF THE INVENTION

This invention relates to a pressure-sensitive switch and to a hydrophone assembly incorporating such a switch. The switch is especially, though not exclusively, intended for use in hydrophone cables such as those used in underwater seismic surveying.

BACKGROUND OF THE INVENTION AND PRIOR ART

Pressure-sensitive switches are used in a variety of applications where it is desired to switch apparatus on or off at predetermined pressures. Switching may be desirable, for example, because the electrical circuitry controlled by the switch may exceed its design limits, might be damaged, or give inaccurate and misleading readings when operated at extreme pressures. Pressure-sensitive switches are also required by certain government regulations in commercial forms of apparatus capable of both commercial and military uses to prevent commercial forms of the apparatus from being converted to military applications.

One important application of pressure-sensitive switches is in hydrophone streamer cable arrays used in underwater surveying. In such surveying, a survey ship tows a plurality of submerged cables extending substantially perpendicular to the ship's direction of travel. Each of the plurality (typically 4–10) of hydrophone cables is secured to one of a series of laterally spaced apart drums located on the ship stem to keep them laterally separated so that they extend parallel to each other and to the ship's direction of travel. Additional lateral control is provided by paravanes associated with each cable to steer them as necessary. These hydrophone cables are of substantial length, up to 5000 meters. Each cable comprises a waterproof hollow elongate prismatic sheath, typically a hollow, flexible polymeric tube and at least one tensile member fixedly associated with the sheath; this tensile member providing structural integrity to the cable so that it will be not damaged by the substantial drag forces exerted upon the lengthy cable as it is towed through the water at speeds of several kilometers per hour. Commercial cables usually have three tensile members in the form of steel cables secured within the plastic tube at intervals of 120°. Hydrophones are secured within the plastic tube, inside the cables and lying on the axis of the tube at regular intervals, typically about 1 m; these hydrophones incorporate pressure detectors, normally piezoelectric detectors, capable of detecting sound pressure in the water caused by the explosions used in seismic surveying. The hollow interior of the tube is filled with oil so that vibrations in the water surrounding the cable are efficiently transmitted to the hydrophones. Electrical conductors extend the full length of the hydrophone cable to supply power to the detectors and to carry signal from the detectors back to recording and/or analysis equipment carried on the ship. Signal conditioning modules are usually included approximately every 300 m for amplification and signal conditioning such as filtering, if required.

Although commercial hydrophone cables are normally towed at depths of about 6 to about 25 meters during seismic surveying, the hydrophones they carry may operate down to 100 meters or more. As will be apparent to those knowledgeable in anti-submarine warfare, in the absence of any special precautions, a commercial hydrophone cable of the type already described would make an excellent submarine-hunting device, and international sales of such cables would have to be regulated under munitions control regulations. To permit international sales of commercial hydrophone cables and certain other dual-use technologies without cumbersome regulations, the United States and thirty-two other countries have concluded the Wassenaar Agreement on Export Controls for Conventional Arms and Dual-Use Goods and Technologies. This Wassenaar Agreement, and the U.S. government regulations promulgated thereunder (see Commerce Control List, Part 774, Supplement No. 1, Category 6 - Sensors and Lasers) provide that hydrophone cables may be freely sold provided they are equipped with pressure-sensitive switches such that the hydrophones will cease to operate at depths exceeding 35 meters. This somewhat arbitrary limit is the average value of the depth of the thermocline present in deep ocean waters; to be useful in anti-submarine warfare, hydrophones must be capable of operating below the thermocline. Further, the commerce control list states that the pressure switches should not be adjustable once installed in the tube.

Providing a suitable form of pressure-sensitive switch to meet this "cut-out" requirement of the Wassenaar Agreement has proved difficult. Such a switch must be inexpensive. In practice, each of the thousands of individual hydrophones in an array needs its own switch (commercial users prefer to buy the hydrophone and the switch as an integrated unit, since installing separate hydrophones and switches in a cable is complicated and too expensive), and since the price for the integrated unit cannot exceed about $12, the cost of the switch must be very low. The pressure at which the switch closes cannot deviate substantially from the desired 35 meter setting, since in practice the hydrophones within each cable are arranged in sections of (typically) 96 further arranged in groups of 8 (typically), and premature closing of any one switch deactivates the entire group of hydrophones, so that premature closing of a few switches among the thousands in an array may deactivate so many hydrophones that the value of the survey may be greatly reduced, or the survey may even have to be suspended while the affected groups of hydrophones are replaced. With the costs of survey ships running into thousands of dollars per hour, such downtime is highly undesirable.

Cables are sometimes also immersed, accidentally or otherwise, more than 35 meters deep, and if the cable is no longer operational after such deep immersion, its replacement is costly, so the switch should also tolerate substantial over-pressure (i.e., it should be capable of being submerged substantially below 35, for example, 150 or more meters) without such over-pressure affecting the pressure at which the switch thereafter closes.

Vibrations from the water flowing past the cables are always a problem in seismic surveying. Since such vibrations appear as "noise" in the detected acoustic signals, it is undesirable for this noise problem to be compounded by vibrations caused by structures within the cable, and thus the in switch should, so far as possible, not transmit vibrations to the hydrophone.

In addition, it is desirable for any switch used with a hydrophone to not appreciably add to the overall volume of the combination since limited space is allocated for each hydrophone in an array assembly. Moreover, it is important to keep the hydrophone sensitive detection areas as far as possible from the noisy boundary layer at the external surface of the cable to enhance signal to noise ratios. Therefore, the switch should not alter any optimized hydrophone design that achieves this feature, and it is desirable for the switch to be acoustically isolated from the hydrophone and not alter its acoustic response characteristics.

Finally, although the cable is designed to surround the hydrophones with a non-corrosive oil, in practice sea water often leaks into a cable during extended commercial use, so the switch should be capable of resisting corrosion by salt water.

Figure 1:
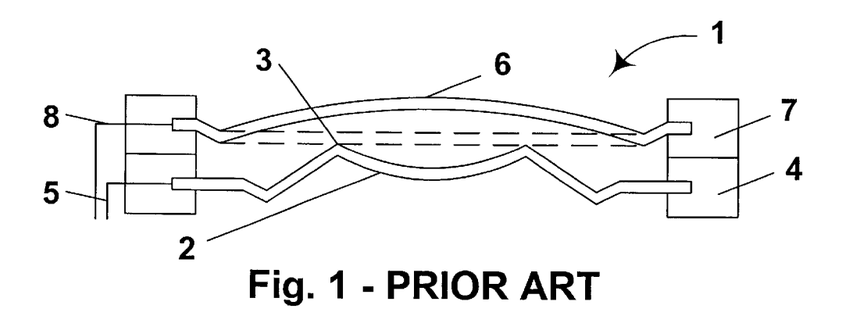
FIG. 1 is, as already described, a schematic cross-section through a prior art pressure-sensitive switch.

A typical prior art pressure-sensitive switch (generally designated 1) is illustrated in schematic cross-section in FIG. 1 of the accompanying drawings. This switch, which is of the so-called "dome" type, comprises a lower diaphragm 2 which is shaped to provide a circular elevated portion 3. The periphery of the lower diaphragm 2 is fixed within an annular insulating washer 4, through which passes an electrical conductor 5 extending from the lower diaphragm 2 to external circuitry (not shown). The switch 1 also comprises a dome-shaped upper diaphragm 6, the periphery of which is fixed within an annular insulating washer 7 which overlays and is secured to the washer 4. An electrical conductor 8 passes through the washer 7 and connects the upper diaphragm 6 to external circuitry. When the switch is exposed to atmospheric pressure, the upper diaphragm 6 stays in the position shown in continuous lines is FIG. 1, but as the pressure gradually increases at some point the "dome" of the upper diaphragm suddenly collapses to an essentially planar form, as shown in broken lines in FIG. 1, thus contacting the lower diaphragm 2 and electrically connecting the conductors 5 and 8 (the upper diaphragm 6 is of course exposed to the external pressure, while the lower diaphragm 2 is not).

Dome switches such as the switch 1 have difficulty in satisfying the aforementioned requirements for pressure-sensitive switches used in hydrophones. The pressure at which the upper diaphragm 6 collapses may be affected by minute variations in thickness or imperfections in material used to form this diaphragm, and hence substantial variations in closing pressure are experienced in batches of such switches. There is no easy method to adjust the closing pressure of individual switches. The switch 1 does not tolerate large over-pressures well since there is a limited area of contact between the upper diaphragm 6 and the narrow elevated portion 3 of the lower diaphragm 2 when the switch is closed. This means that under substantial over-pressure this limited area of contact is under great stress, and the upper diaphragm is likely to undergo non-elastic, permanent deformation, which changes the closing pressure of the switch after the over-pressure has been removed. It is difficult to make the switch 1 corrosion resistant, at least in part because the sudden sharp deformation which the upper diaphragm undergoes as the switch closes tends to crack any corrosion-resistant layer coated on to this upper diaphragm. To provide sufficient corrosion-resistance, it is conventional practice to embed the switch 1 within the same polymeric "potting" compound in which the hydrophone itself is typically embedded; however, this embedding of the switch increases the stiffness of the dome and substantially increases the pressure required to close the switch. Further, the potting compound may be affected by environmental changes such as temperature of the surrounding fluid, causing large variations in closure pressures over time. Finally, the switch 1 shows a tendency to fail mechanically by separation of the two washers 4 and 7, presumably because the sudden collapse of the upper diaphragm 6 as the switch closes exerts a strong radially outward force on the washer 7, thereby tending to cause it to separate from the washer 4.

The present invention seeks to provide a pressure-sensitive switch which is very suitable for use in a hydrophone cable (although it may be used in numerous other applications) and which reduces or eliminates the aforementioned disadvantages of prior art pressure sensitive switches. Preferred embodiments of the switch of the present invention allow adjustment of the closing pressure of individual switches at the time of manufacture. The switch of the present invention is especially useful in conjunction with hydrophones of the types described in U.S. Pat. No. 5,646,470 and 5,675,556, which are substantially cylindrical with openings at each end through which the external pressure is transmitted to the interior of the hydrophone.

SUMMARY OF THE INVENTION

This invention provides a pressure-sensitive switch comprising:

a base member having a mounting surface formed of electrically-insulating material;

first and second electrodes mounted on the base member, each of these electrodes having an exposed, electrically-conductive contact surface disposed adjacent the mounting surface of the base member; and a flexible diaphragm having a peripheral portion fixedly secured in a substantially fluid-tight manner to the mounting surface and a central portion overlying the contact surfaces of the first and second electrodes, at least the central portion of the diaphragm being formed of electrically-conductive material, being exposed to the pressure surrounding the switch, and being formed with plural corrugations, such that when the switch is exposed to atmospheric pressure, the central portion of the diaphragm is spaced from the contact surfaces of the electrodes, but when the switch is exposed to a pressure substantially in excess of atmospheric pressure, the central portion of the diaphragm is forced into contact with both contact surfaces, thereby electrically connecting the first and second electrodes to each other.

This invention extends to a vibration-detector assembly comprising a vibration-detector (preferably a hydrophone) and a pressure-sensitive switch arranged to inactivate the vibration detector when the assembly is subjected to a pressure greater than a predetermined value, in which assembly the pressure-sensitive switch is a switch of the present invention.

Finally, this invention provides a hydrophone cable assembly comprising:

a waterproof hollow elongate sheath;

at least one tensile member fixedly secured to the sheath;

a plurality of hydrophones disposed within the hollow interior of the sheath at spaced intervals therealong;

signal transmission means for transmitting signals from the plurality of hydrophones to one end of the sheath; and at least one pressure-sensitive switch of the present invention arranged to inactivate the hydrophones when the hydrophone cable assembly is subjected to a pressure greater than a predetermined value.

BRIEF DESCRIPTION OF THE DRAWINGS

The structure and operation of the pressure-sensitive switch of the present invention, together with other objects and advantages thereof, may best be understood by reading the detailed description in connection with the drawings in which unique reference numerals have been used throughout for each part and wherein.

DETAILED DESCRIPTION OF THE INVENTION

Figure 2:
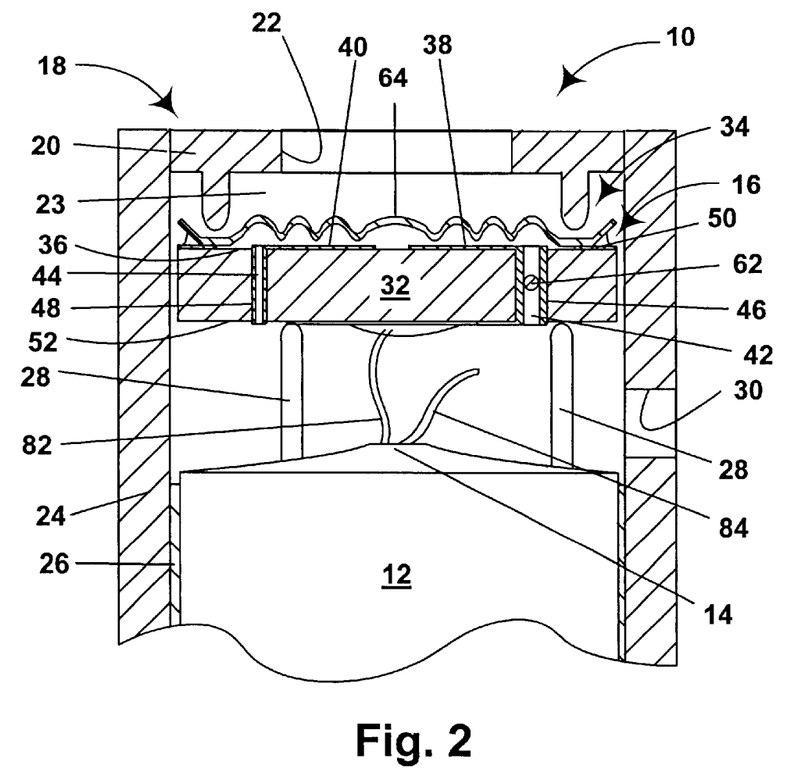
FIG. 2 is cross-section of a first pressure-sensitive switch of the present invention shown mounted on a hydrophone by means of a cap.

FIG. 2 shows a hydrophone assembly (generally designated 10). This hydrophone assembly comprises a hydrophone 12; for simplicity all details of the hydrophone 12, which is substantially cylindrical, are omitted from FIG. 2 except for the presence of an aperture 14 in one end wall of the cylindrical hydrophone 12. The hydrophone assembly also comprises a pressure-sensitive switch (generally designated 16) of the present invention and a cap (generally designed 18) which retains the switch 16 on one end of the hydrophone 12.

As shown in FIG. 2, the cap 18 comprises a flat, circular end wall 20 having a central aperture 22, which is surrounded by a short cylindrical retaining member 23. A cylindrical skirt 24 extends perpendicular to the periphery of the end wall 20 around the switch 16 and the adjacent portion of the hydrophone 12, to which it is secured with adhesive 26. The internal surface of the skirt 24 is provided with four ribs 28 (only two of which are visible in FIG. 2) extending parallel to the axis of the cylindrical skirt and equally spaced therearound. The ribs 28 terminate short of the end wall 20 and support the switch 16 in position, as described in more detail below. The skirt 24 is also provided with an aperture 30. Potting compound may be introduced through aperture 30 to fill the space between the hydrophone 12 and the switch 16. Alternatively, the intervening space between hydrophone 12 and switch 16 may be left open in which case external pressure may be directly communicated to the aperture 14 in the hydrophone 12.

Figure 3A:
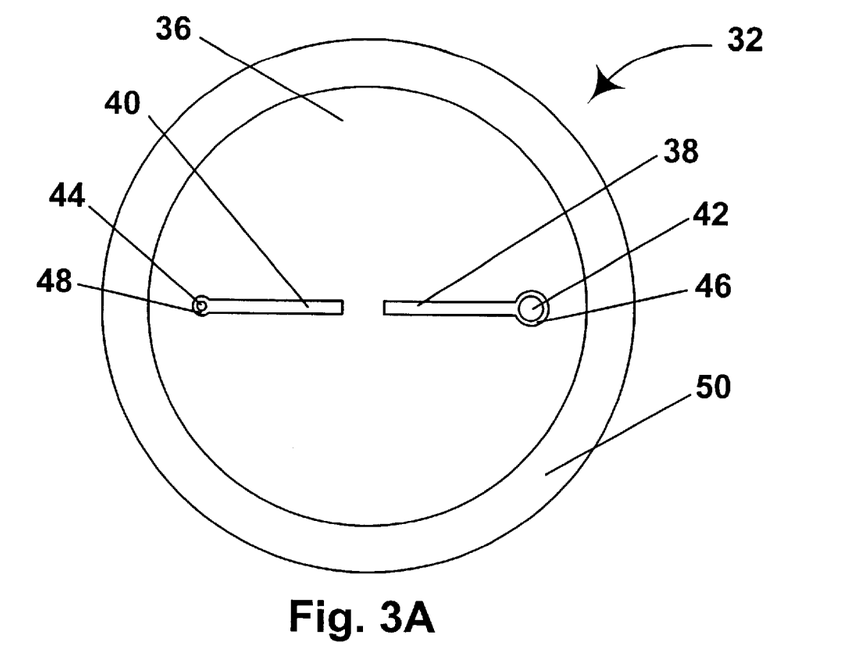
FIG. 3A is a top plan view of the base member of the pressure-sensitive switch shown in FIG. 2.
Figure 3B:
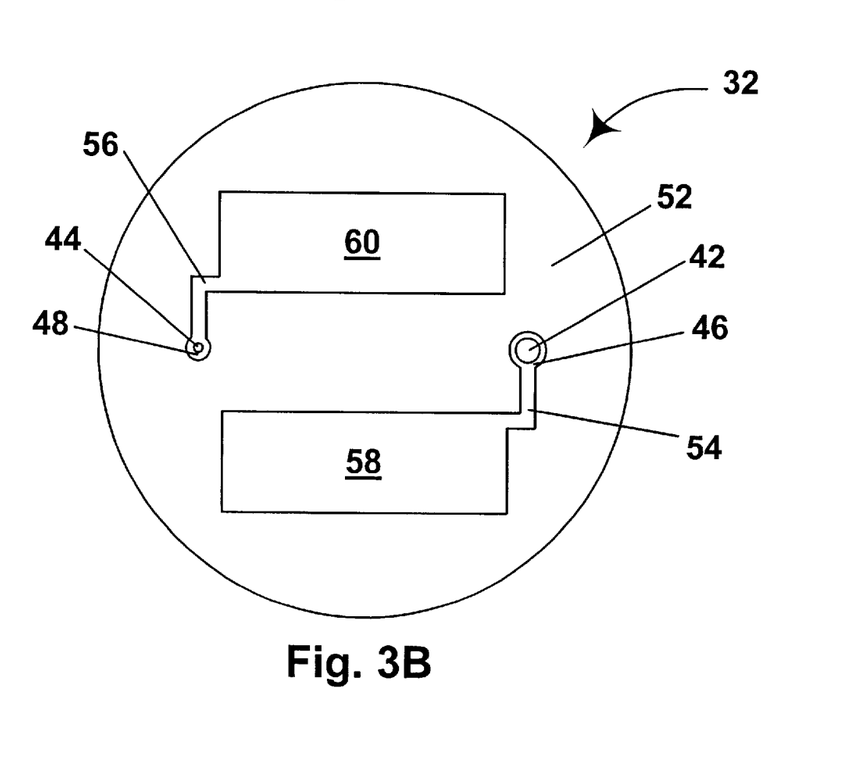
FIG. 3B is an underneath plan view of the base member of the pressure-sensitive switch shown in FIG. 2.
Figure 3C:
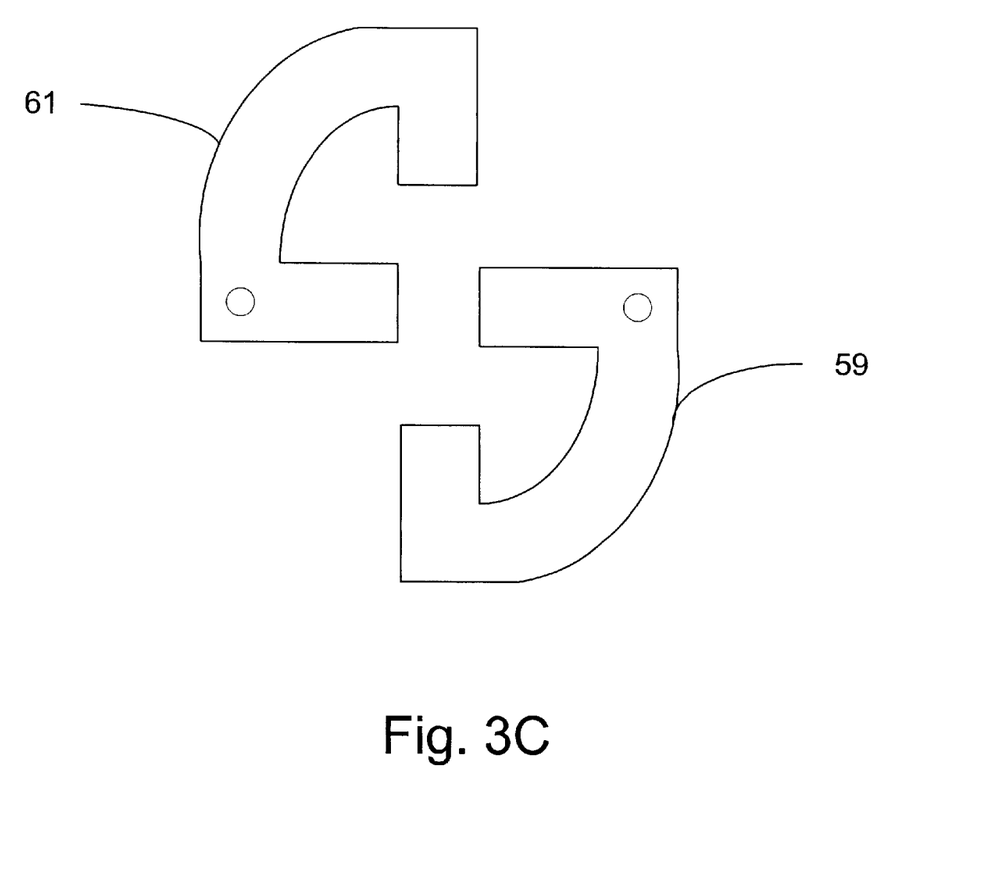
FIG. 3C is a top plan view of an alternative switch contact pattern.
Figure 4:
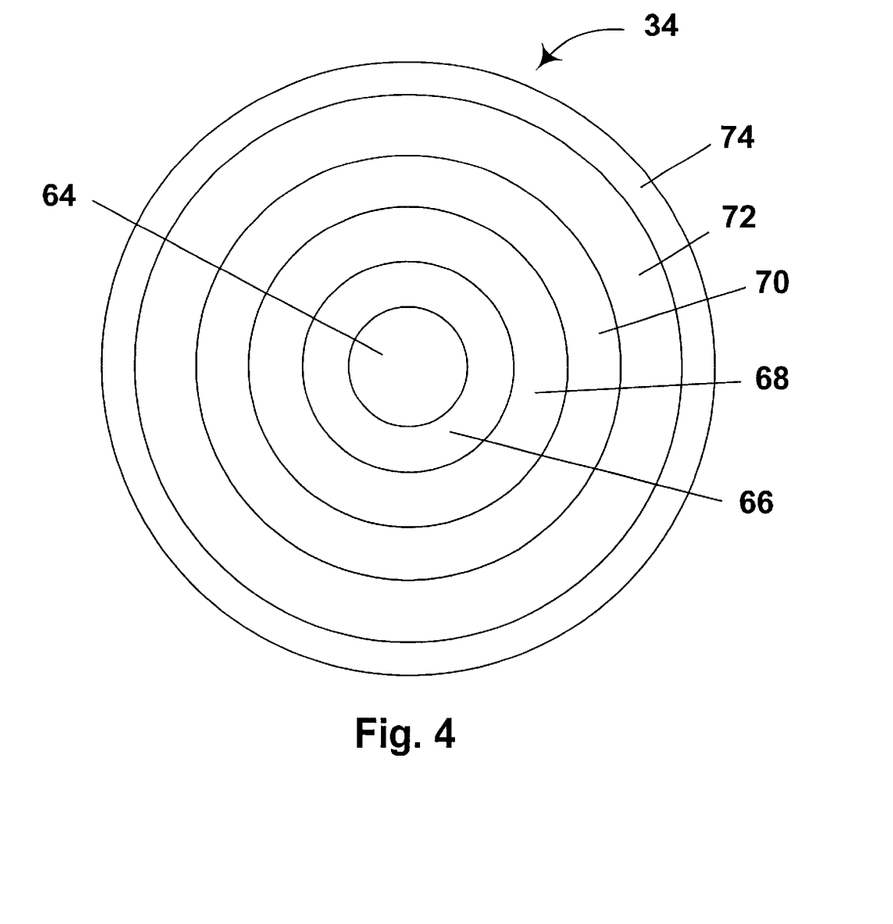
FIG. 4 is a top plan view of the diaphragm of the pressure-sensitive switch shown in FIG. 2.
Figure 5:
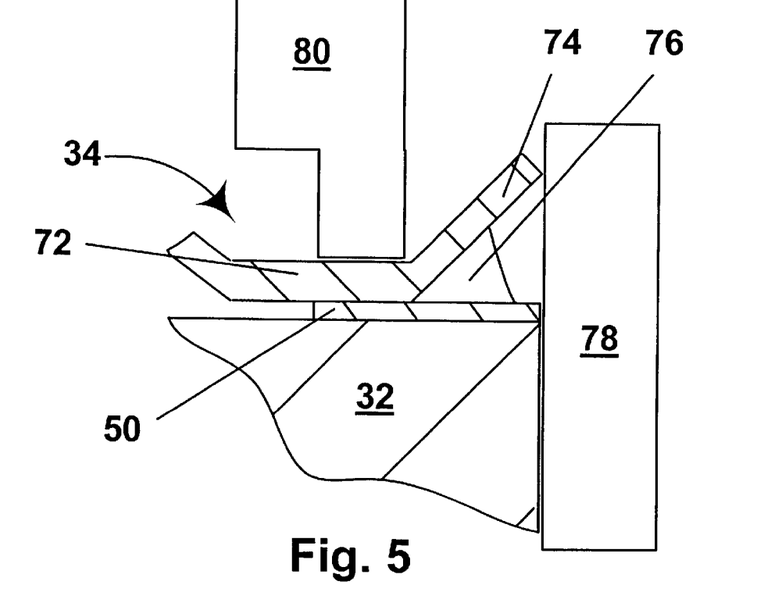
FIG. 5 is an enlarged cross-section of the peripheral portion of the diaphragm and the adjacent portion of the base member of the pressure-sensitive switch shown in FIGS. 2, 3 and 4 and illustrates the manner in which the diaphragm is secured to the base member.

As shown in FIGS. 2–5, the pressure-sensitive switch 16 has two main components, a base member 32 having the form of a flat, circular plate formed of electrically-insulating material (e.g., G-10), and a diaphragm (generally designated 34) which is secured to the upper surface 36 of the base member 32 in a manner described in detail below with reference to FIG. 5. The base member 32 is in effect a small, double-sided printed circuit board, and indeed it is one of the advantages of the preferred embodiment of the invention shown in FIGS. 2–5 that the base member 32 can be inexpensively produced in large volumes and excellent yield using conventional, well-understood techniques for the manufacture of printed circuit boards.

As best seen in FIG. 3A, the upper, mounting surface 36 of the base member 32 is provided with first and second flat, laminar, elongate rectangular metal electrodes 38 and 40 which extend radially outwardly from adjacent the axis of the circular mounting surface 36, the two electrodes 38 and 40 being separated by a small gap in the center of the mounting surface 36. The radially outward ends of the electrodes 38 and 40 lie adjacent apertures 42 and 44 respectively, the aperture 42 being of larger diameter than the aperture 44. As best seen in FIG. 2, the apertures 42 and 44, which extend completely through the base member 32, bear internal metal coatings 46 and 48, respectively, and the upper ends of these coatings 46 and 48 contact the electrodes 38 and 40, respectively. The mounting surface 36 also bears around its periphery a conductive metal annulus 50. As shown in FIG. 3B, the ends of the coatings 46 and 48 at the lower (in FIG. 2) surface 52 of the base member 32 contact conductors 54 and 56, respectively, which extend from the coatings 46 and 48 to flat, laminar, rectangular contact pads 58 and 60 respectively. The electrodes 38, 40, the contact pads 58 and 60, the conductors 54 and 56, and the annulus 50 can be formed by printing or similar processes, while the internal metal coatings 46 and 48 can be formed by techniques well known to those skilled in printed circuit board technology. In the areas of the surfaces 36 and 54 of the base member 32 not covered by the electrodes, contact pads conductors, internal coatings or annulus already described, the electrically-insulating material from which the base member 32 is formed is exposed, so these areas of the surfaces 36 and 52 are electrically insulating. The larger aperture 42 is blocked in a gas-tight manner by a sealing member 62 (see FIG. 2).

As shown in FIGS. 2 and 4, the diaphragm 34 has essentially the form of a corrugated metal disk. More specifically, the diaphragm 34 has a central metal boss 64 located on its axis and, in order moving radially outwardly from this boss 64, three corrugations 66, 68 and 70, each of which is centered on the axis of the diaphragm 34, an annular contact portion 72, which lies flat against the annulus 50 (see FIG. 2), and a peripheral flange 74 which extends outwardly and upwardly away from the mounting surface 36. As best seen in FIG. 5, the peripheral flange 74 is secured, in a gas-tight manner, to the annulus 50 on the mounting surface 36 by solder 76; this solder 76, which is drawn into the joint by capillary action, extends beneath the contact portion 72 of the diaphragm 34, but is of minimum thickness due to the soldering technique employed as explained more fully below.

The manner in which soldering of the peripheral flange 74 to the annulus 50 is achieved, without the solder penetrating beneath the contact portion 72, is indicated in a highly schematic manner in FIG. 5. As shown in that Figure, the base member 32 is placed within a jig or similar restraining device (indicated schematically at 78) and a torus of solder is placed on the annulus 50. Next, the diaphragm 34 is placed on top of the mounting surface 36 of the base member 32 using the same jig 78, and the contact portion 72 of the diaphragm is forced into firm contact with the annulus 50 by means of a clamping member 80, which has a lower end shaped and sized so as to contact substantially the whole upper surface of the contact portion 72 but no other part of the diaphragm. Conveniently, the clamping member 80 can be forced into firm contact with the contact portion 72 by static weight or a hydraulic or pneumatic ram. The whole assembly is then placed within an induction heater, which generates heat within the solder 76 and within the diaphragm 34, thus melting the solder 76, which is drawn by capillary action into the narrow radially inward end of the essentially V-shaped groove formed between peripheral flange 74 and the annulus 50. However, the pressure exerted by the clamping member 80 on the contact portion 72 is sufficient to prevent most of the melted solder 76 penetrating between the contact portion 72 and the annulus 50. Finally, the induction heater is switched off and the assembly allowed to cool before being removed from the jig 78.

The provision of the solder 76 beneath substantially only the flange 74 and minimizing it beneath the contact portion 72 is important in securing accurately reproducible characteristics in the pressure-sensitive switch 16. As skilled mechanical engineers will readily appreciate, the deformation undergone by the diaphragm 34 under any specific external pressure is strongly dependent upon the exact area of the diaphragm which can deform under the pressure. By providing a gas-tight seal between the peripheral flange 74 and the annulus 50 by means of the solder 76, and allowing the contact portion 72 to lie flat against the annulus 50, the pressure-sensitive switch 16 allows only the portion of the diaphragm 34 disposed radially inwardly of the contact portion 72 to deform under the external pressure. Since this portion of the diaphragm 34 can be made of a consistent size and shape, for example by die stamping the diaphragm 34 from a flat metal disk, the deformation characteristics of the diaphragm can be made accurately reproducible even when the diaphragms are manufactured in batches of several thousand. For example, slight variations in the diameters of the starting disks will merely result in similar variations in the size of the peripheral flange 74 and will not affect the size or shape, or hence the deformation characteristics, of the portion of the diaphragm lying radially within the contact portion 72.

Returning to FIG. 2, it will be seen that the cap 18 holds the switch 16 spaced from the hydrophone 12. This spacing between the switch 16 and the hydrophone 12 allows external pressure to be communicated to the hydrophone via intervening potting compound or fluid filled apertures 14 and 30, as the case may be. The spacing between the switch 16 and the hydrophone 12 also provides a degree of acoustic decoupling between the two such that the response of the hydrophone 12 is not dependent directly on the properties of the switch 16 but only on its influence as part of the hydrophone/switch assembly. The cap 18, which is normally formed of a low hardness (soft) polymer is a relatively inefficient transmitter of vibrations from the switch 16 to the hydrophone 12. The retention of the switch 16 in its position spaced from the hydrophone 12 is effected by the ribs 28 and the retaining member 23 on the cap 18. The upper ends of the ribs 28 contact the lower surface 52 of the base member 32, while the lower end (in FIG. 2) of the retaining member 23 contacts only the annular contact portion 72 of diaphragm 23; this contact between the retaining member 23 and the upper surface of the diaphragm 34 does not, of course, affect the deformation characteristics of the diaphragm since the annular contact portion 72 is essentially isolated from pressure influence on the active part of the diaphargm 34.

FIG. 2 also illustrates the manner in which the switch 16 is connected to external circuitry. Conductors 82 and 84 (the insulation which would in practice be present over most of the length of these conductors is omitted for ease of illustration) are soldered to contact pads 58 and 60 (see FIG. 3B, from which the conductors 82 and 84 are omitted for ease of comprehension) respectively, on the lower surface 52 of the base member 32 and extend through the aperture 14 into the interior of the hydrophone 12 (not shown in the drawings), where they are connected to the conductors running from the hydrophone itself. Obviously, the path taken by the conductors 82 and 84 may vary depending upon the type of hydrophone used. For example, if the hydrophone 12 is of a type which has the form of a closed cylinder (see, for example, U.S. Pat. No. 3,970,878) which needs to be mounted in potting compound within an outer cylindrical jacket, the conductors 82 and 84 can be run through the potting compound and joined, at the end of the hydrophone 12 remote from the switch 16, to the conductors running from the hydrophone itself.

The manner in which the pressure-sensitive switch 16 operates will now be described with reference to FIG. 2, which shows the switch with its diaphragm 34 in the position it occupies when the switch is under atmospheric pressure. At this pressure, the diaphragm 34 is undeformed and is spaced from the electrodes 38 and 40 on the mounting surface 36 of the base member 32. Indeed, it is one of the significant advantages of the present pressure-sensitive switch that this spacing can be larger than in prior art pressure-sensitive switches. Desirably, this spacing is at least about 0.005 inch (0.127 mm) and most desirably is at least about 0.010 inch (0.254 mm). This relatively large spacing, coupled with the essentially linear response to the diaphragm 34 to increasing pressure (discussed in detail below with reference to FIG. 9), ensures that the pressure at which the switch 16 closes is less sensitive to inevitable manufacturing variations than are the closing pressures of prior art pressure-sensitive switches. Accordingly, at atmospheric pressure the electrodes 38 and 40 are not in electrical contact with each other. Moreover, the relatively longer displacement to contact resulting in a shallower displacement to pressure slope makes it easier to reliably reach the set point on a device to device basis.

As the external pressure is increased, and this increased pressure is transmitted to the outer surface of the diaphragm 34 via the central aperture 22 in the cap 18, the diaphragm gradually deforms downwardly (in FIG. 2) until eventually the trough of the corrugation 66 contacts both the electrodes 38 and 40, thereby closing the switch and establishing electrical contact between these electrodes, and hence between the conductors 82 and 84. For reasons discussed above, it is preferred that the switch close under a pressure substantially equal to that exerted by about 35 meters of water.

The construction of the diaphragm 34 renders the switch 16 capable of withstanding large over-pressures (i.e., pressures in excess of that needed to close the switch). As already described, when the switch closes, the troughs of the corrugations contact the electrodes 38 and 40, and these troughs also contact parts of the mounting surface 36, acting as tightly spaced annular trusses. The resultant large area of contact between the diaphragm 34 and the mounting surface 36 allows a large area over which the substantial over-pressure exerted on the diaphragm can be distributed, and hence allows the diaphragm to withstand the substantial over-pressure without developing concentrations of stress sufficient to cause permanent, non-elastic deformation of portions of the diaphragm. Accordingly, when the over-pressure is released, the diaphragm returns elastically to its original form as shown in FIG. 2, and the pressure at which the switch 16 closes remains unchanged. Preferred embodiments of the pressure-sensitive switch of the present invention have been shown to withstand pressure in excess of 200 meters of water without undergoing any permanent deformation.

Obviously, for the switch to be able to resist substantial over-pressures in this manner, the diaphragm should be constructed of a material capable of resisting large stresses without permanent deformation, and the preferred material for use in the diaphragm is heat treated and hardened beryllium copper (e.g.,C17200), preferably in a thickness of about 0.004 inch (0.102 mm). Also, since the upper surface (in FIG. 2) of the diaphragm is in direct contact with the medium surrounding the hydrophone assembly 10, the diaphragm may, for reasons explained above, be exposed to corrosive sea water. Although the preferred beryllium copper material is itself relatively corrosion-resistant, it is generally preferred that the diaphragm 34 be coated first with nickel and then gold; the gold being primarily used to provide good electrical contact between the contacts on the G-10 and the BeCu diaphragm in contact with them and the nickel to promote good solderability as well as a barrier to prevent copper migration to the gold layer, potentially making it ineffective. The outer surface of the diaphragm 34 also is preferably provided with a coating of tin to act as an anode to promote corrosion resistance, especially in the presence of salt water. Since the diaphragm 34 does not undergo any sudden collapse under increasing pressure, but rather smoothly and continuously deforms until it contacts the electrodes 38 and 40, there is little tendency for the deformation of the diaphragm to cause cracking of the corrosion-resistant coating.

In practice, the diaphragm is preferably first formed of annealed BeCu so that it is more easily workable and thereafter is hardened by heat treatment.

As already mentioned, it is one of the advantages of the pressure-sensitive switch of the present invention that preferred forms of the switch allow adjustment of the closing pressures of individual switches, and the preferred switch shown in FIGS. 2–5 is designed to allow such adjustment to be effected in two different ways. Firstly, if the closing pressure of the switch as manufactured is too high, the switch may be subjected to a large over-pressure (which is preferably applied by pneumatic, hydrostatic means such as through the use of positive air pressure or immersion in a liquid, but could, for example, be applied by appropriately configured mechanical means) sufficient to cause permanent deformation of the diaphragm 34, thereby reducing the spacing between the diaphragm 34 and the electrodes 38 and 40 when the switch is under atmospheric pressure, and hence reducing the closing pressure of the switch. Obviously, before such "adjustment by over-pressure" can be carried out accurately, it is necessary to determine empirically the over-pressure needed to correct any specific initial closing pressure to the desired value, but given that the switches 16 will normally be manufactured in batches of at least several thousand, the sacrifice of a modest number of switches during such empirical calibration does not pose a serious cost problem. Alternatively, the switch assembly may also be exposed to elevated temperatures (approximately 65° C. or higher) while under "light" pressure of, say 51 psi, to achieve essentially the same drop in switch closure pressure. Either approach is believed to result in a "stress relief" effect. Stresses are built-in when the diaphragm is soldered to the G-10 because the BeCu expands approximately twice as much as the G-10 material so that, when the solder solidifies, the diaphragm is still in an expanded state. Thus, when returned to ambient, the diaphragm is trying to restore to its original diameter causing an induced stress the influences closure pressure. This induced stress can be relieved using a combination of temperature and pressure treatment to thereby drop the closure pressure as needed and stabilize the device.

Secondly, if the closing pressure of the switch as manufactured is too low or high, the pressure within the gas-tight chamber between the mounting surface 36 and the diaphragm 34 may be increased or decreased as needed. For this purpose, the switch is assembled without the sealing member 62, and its closing pressure is determined. The aperture 42 is then connected to a supply of pressurized gas, the pressure within the gas-tight chamber raised or lowered to a desired value (which again is normally established by empirical calibration) and the sealing member 62 forced into the aperture 42 to close this aperture in a gas-tight manner. Increasing the pressure between the mounting surface 36 and the diaphragm 34 in this manner increases the closing pressure of the switch, since the external pressure exerted on the upper surface of the diaphragm must overcome not only the resistance of the diaphragm to deformation, but also the super-atmospheric pressure exerted on the lower surface of the diaphragm; this super-atmospheric pressure of course increases as the gas trapped between the diaphragm and the mounting surface is compressed by the deformation of the diaphragm towards the mounting surface under increasing external pressure. Likewise, the pressure may be decreased with opposite effect.

Figure 6:
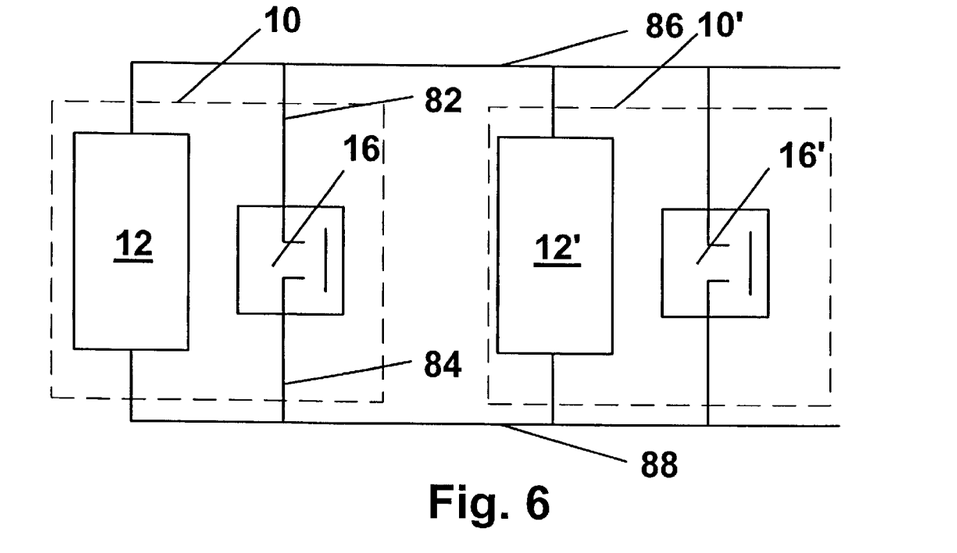
FIG. 6 is a simplified circuit diagram of part of a hydrophone cable incorporating pressure-sensitive switches as shown in FIGS. 1–5.

FIG. 6 is a simplified circuit diagram of a part of a hydrophone cable and illustrates the manner in which the switch 16 shown in FIGS. 2–5 is used to inactivate the hydrophone 12 when the pressure on the hydrophone cable exceeds a predetermined pressure. As shown in FIG. 6, the hydrophone 12 and the switch 16, which together form the single hydrophone assembly 10 already described, are connected in parallel between two conductors 86 and 88 which run the length of the hydrophone cable or a section of cable. As is well-known to those skilled in the manufacture of hydrophone cables, within such cables the hydrophones are arranged in sections of (typically) about 96 hydrophones and groups of (typically) about 8; for simplicity, the remaining hydrophones of the group shown in FIG. 6 are represented by a single hydrophone assembly 10' comprising a hydrophone 12' and a switch 16'.

The conductors 86 and 88 carry the electrical signals generated by the hydrophone 12 and 12' to the recording and/or analytical apparatus on the survey vessel towing the hydrophone cable, but can only carry such signals so long as a potential difference can be maintained between the two conductors, i.e., so long as the switches 16 and 16' remain open. When the water pressure on the hydrophone cable exceeds the predetermined closing pressure of the switches 16 and 16', these switches short the two conductors 86 and 88, thereby preventing signals from the hydrophones 12 and 12' being transmitted to the survey vessel, and in effect inactivating the hydrophones. Indeed, it will be seen that only one of the switches 16 and 16' need close to inactivate the entire group of hydrophones, since a single connection between the two conductors 86 and 88 suffices to inactivate all the hydrophones in the group. Thus, the provision of multiple switches 16 and 16' provides a "fail-safe" system which ensures that even if for some reason one or more of the switches within a group of hydrophones fails to close at the predetermined pressure, at least one switch will still close and the group of hydrophones will still be inactivated.

Figure 7:
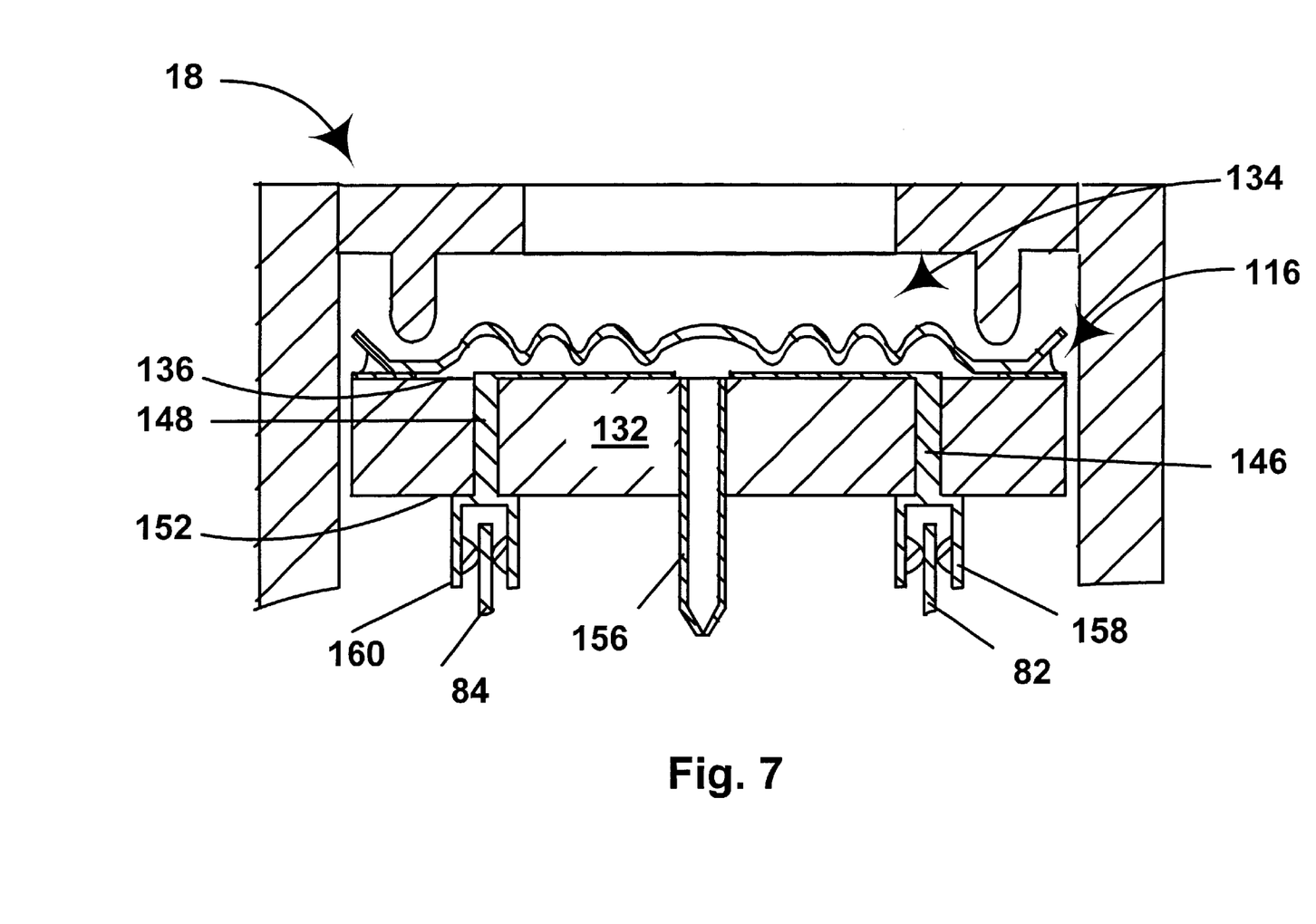
FIG. 7 is a cross-section, generally similar to that of FIG. 2, but with the hydrophone and part of the cap omitted, through a second pressure-sensitive switch of the present invention having an alternate means of adjusting the pressure within the switch.

The second pressure-sensitive switch (generally designated 116) of the present invention shown in FIG. 7 is similar to that of the switch 16 shown in FIGS. 2–5 and also permits adjustment of its closing pressure either by application of over-pressure to the upper surface (in FIG. 7) of its diaphragm 134 or by adjustment of the pressure within a gas-tight chamber formed between this diaphragm 134 and the mounting surface 136 of its base member 132. However, the switch 116 is designed to that after the pressure within this gas-tight chamber has been adjusted to the desired value, the sealing of the gas-tight chamber is effected not by inserting a sealing member into an aperture passing through the base member 132 but rather by physically deforming the walls of such an aperture so as to close it in a gas-tight manner.

To this end, apertures 42 and 44 present in the first pressure-sensitive switch described above are replaced with a single aperture into which is secured a metal tube 156, which fits tightly within the aperture and extends downwardly past the lower surface 152 of base member 132. The electrical connections from electrodes 138 and 140 present on the mounting surface 136 of base member 132 do not pass through the metal tube 156. Instead, conductors 146 and 148 pass directly through the base member and are electrically connected to plug-in connectors 158 and 160 extending downwardly from the lower surface 152 of base member 132. The conductors 82 and 84 are inserted directly into the plug-in connectors 158 and 160.

To adjust the pressure within the gas-tight chamber, the tube 156 is connected to a supply of pressurized gas, thus increasing the pressure within the gas-tight chamber to the desired value, and then the lower end of the tube 156 is crimped shut so that it is gas-tight, thus sealing the chamber and maintaining the pressure therein at the desired value. Preferably, tube 156 is soldered after crimping to provide long seal life.

Figure 8:
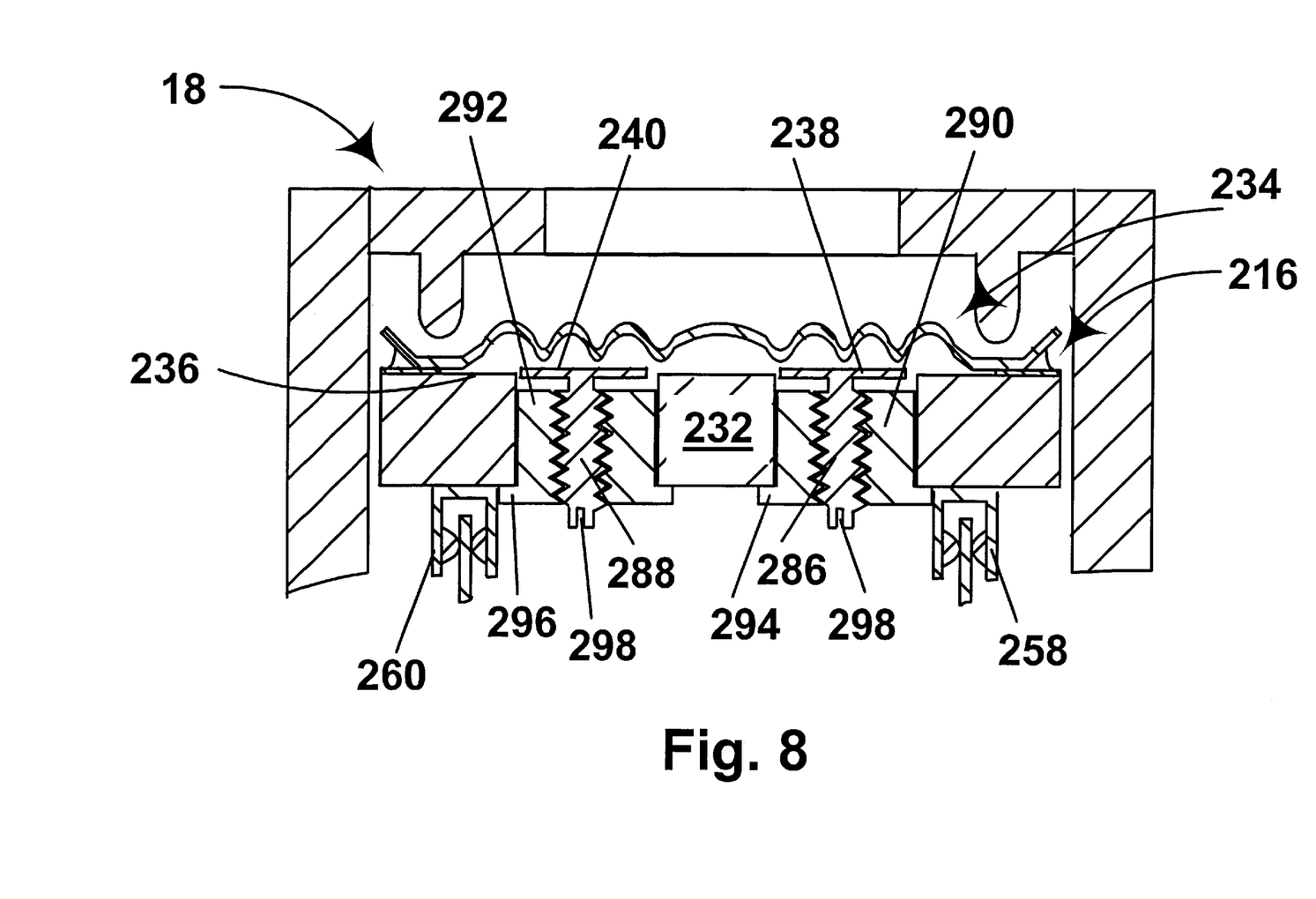
FIG. 8 is a cross-section, generally similar to that of FIG. 7, though a third pressure-sensitive switch of the present invention in which the electrodes are movable relative to the mounting surface.

The third pressure-sensitive switch (generally designated 216) of the present invention shown in FIG. 8 differs from the pressure-sensitive switches previously described in that it allows adjustment of its closing pressure by movement of its first and second electrodes relative to its diaphragm. As shown in FIG. 8, these electrodes 238 and 240 are not fixedly mounted on the mounting surface 236 of base member 232 as are the electrodes in the switches 16 and 116, but instead have the form of flat disks integral with threaded stems 286 and 288, which are engaged in internally-threaded plugs 290 and 292 secured within apertures passing through the base member 232. Radially outwardly extending flanges 294 and 296 are provided on plugs 290 and 292 respectively to prevent the plugs sliding along the apertures 290 and 292, and the lower ends of stems 286 and 288 are provided with slots 298 into which a screwdriver or similar tool can be inserted to rotate the stems 286 and 288. The lower surface 252 of base member 232 is provided with plug-in connectors 258 and 260 identical to connectors 158 and 160 of the second switch 116 already described; these connectors 258 and 260 are soldered to plugs 290 and 292 respectively.

Adjustment of the closing pressure of the switch 216 is effected by rotating the stems 286 and 288, thereby moving the electrodes 238 and 240 perpendicular to the mounting surface 236. Obviously, the higher the electrodes 238 and 240 protrude above the mounting surface 236, the less will be the deformation of the diaphragm 234 needed to contact the electrodes 238 and 240 and the lower will be the closing pressure of the switch. It is important that the electrodes 238 and 240 be adjusted together so that they remain at the same height relative to the mounting 236, in order to prevent excessive concentrations of stress on the diaphragm 234 as it contacts the electrodes. The closing pressure of the switch 216 can also be effected by the over-pressure method previously described.

Figure 9:
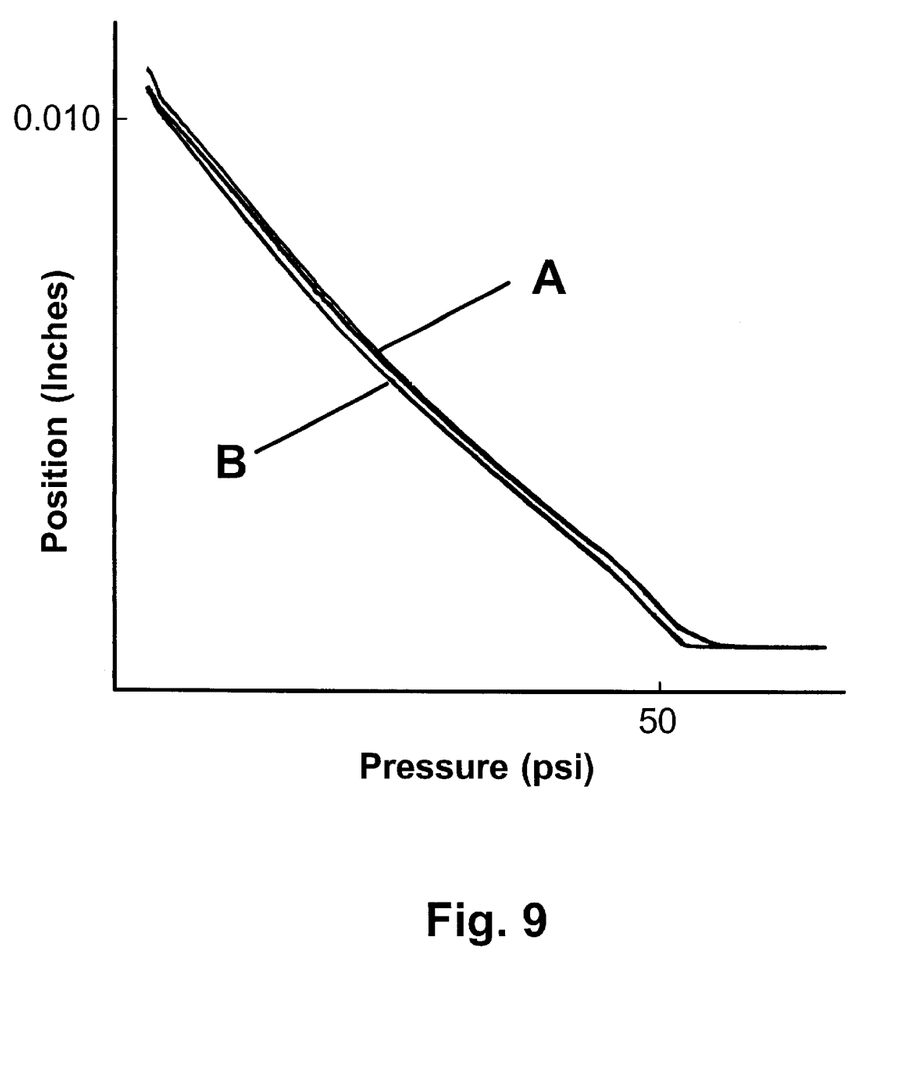
FIG. 9 is a graph showing the displacement of the diaphragm of the of the pressure-sensitive switch shown in FIGS. 2–5 with increasing external pressure.

FIG. 9 is a graph of the position of the diaphragm 34 of the pressure-sensitive switch 16 shown in FIGS. 2–5 with increasing pressure on the diaphragm, the "curve" A representing the diaphragm position as the pressure is gradually increased from atmospheric pressure to slightly greater than the closing pressure of the switch 16, and curve B representing the diaphragm position as the pressure is gradually reduced back to atmospheric. It will be seen from FIG. 9 that the deformation of the diaphragm varies, to a very high degree, linearly with the external pressure exerted on the diaphragm, in marked contrast to prior art pressure-sensitive switches, most of which undergo little deformation under close to their closing pressures, at which point there is a sudden deformation as the switch closes. Also, the closeness of the curves representing increasing and decreasing pressure in FIG. 9 shows that the diaphragm has little hysteresis and undergoes essentially no permanent deformation as the switch closes.

It will be apparent to those skilled in the art of manufacturing pressure-sensitive switches that numerous changes and modifications can be made in the preferred switches described above. For example, the conductors connecting the electrodes on the mounting surface of the base member to external circuitry need not pass completely through the base member, but could emerge from the edges of the base member, or could extend radially outwardly from the electrodes and pass beneath the periphery of the diaphragm, provided of course that appropriate insulation was provided to isolate the conductors electrically from the diaphragm. Additionally, the contacts need not be comprised of only two conductive pads, but could be formed by interleaving many more contacts, all or any of which may be a capable of causing electrical switch closure as shown, for example, as contacts 59 and 61 if FIG. 3C. Also, for example, the switch need not be mounted by means of a cap on the end face of a cylindrical hydrophone; instead, the switch might be mounted upon the cylindrical side wall of such a hydrophone by means of a band passing around the hydrophone, or, if the hydrophone is of the type described in the aforementioned U.S. Pat. No. 5,646,470 or 5,675,556, which have a hollow rectangular prismatic member running axially the length of a cylindrical hydrophone and open to the external pressure, the switch might be mounted within this rectangular prismatic member. The former patent describes and claims a hydrophone having a transducer comprising an elongate chamber having at least one open end to allow fluid to flow into the chamber; a piezoelectric sensor mounted inside the chamber, the sensor having faces defined by edges, and wicking material inside the chamber between the sensor and the chamber, for wicking fluid into the chamber. The latter patent describes and claims a hydrophone comprising a substantially cylindrical casing; an electrically conductive support element within the casing, the support element defining a sound conductive channel through the support element, wherein the casing and the support element define a volume therebetween; a piezoelectric crystal on the support element outside the channel, the crystal defining a first surface in contact with the support element and a second surface opposite the support element; a first output terminal of the transducer electrically coupled to the support element; and a second output terminal of the transducer electrically coupled to the second surface. Additionally, it will be realized that the switch may be oriented to be other than perpendicular to the longitudinal axis of an associated hydrophone; it may, for example, be parallel or arranged at some other angular orientation.

Figure 10:
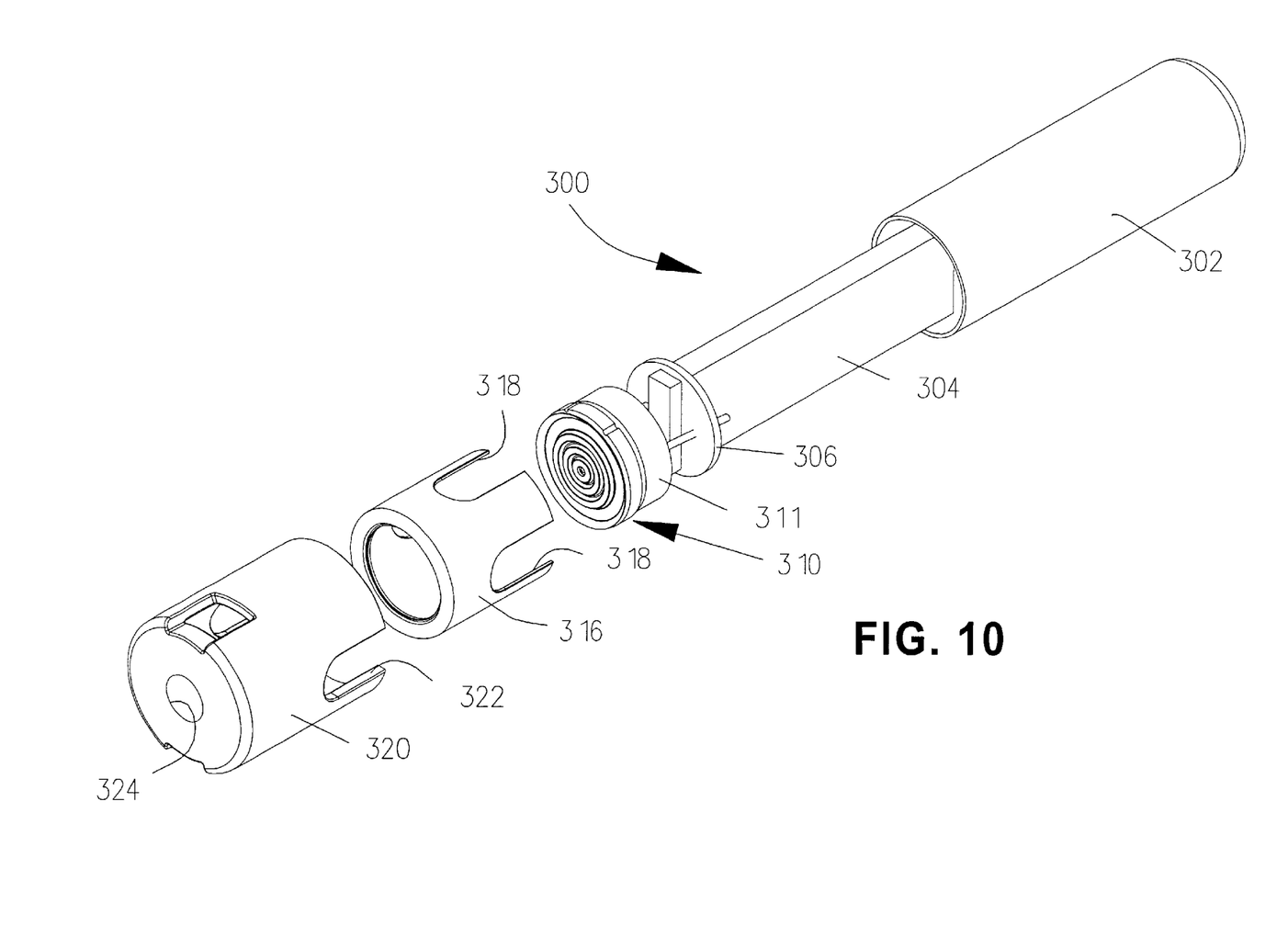
FIG. 10 is a diagrammatic exploded perspective view of a hydrophone system incorporating the pressure sensitive switch of FIGS. 2–5.
Figure 11:
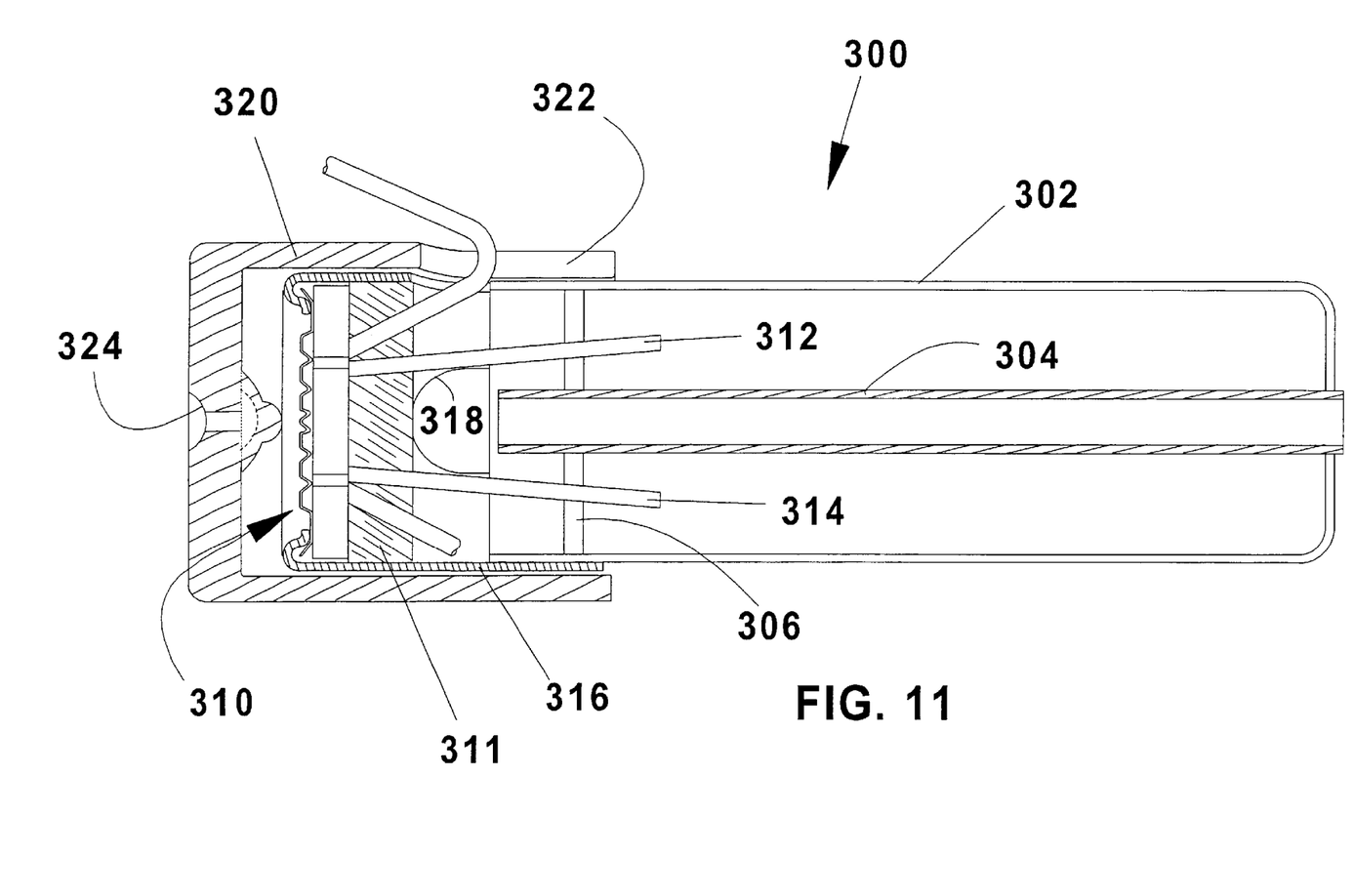
FIG. 11 is a diagrammatic cross-sectional elevation of the hydrophone system of FIG. 10.

An example of a hydrophone system incorporating the pressure sensitive switch previously described is shown diagrammatically in FIGS. 9 and 10 where the system is designated generally at 300. System 300 is seen to comprise an elongated tin coated brass tubular housing 302 inside of which resides a hollow rectangular transducer 304 having piezoelectric crystals for detection of pressure variations. Transducer 304 is supported in housing 302 via a circular rib 306 located at the forward end thereof and rearwardly by directly soldering it to housing 302. Located forwardly of transducer 304 is the switch 310 having electrical leads 312 and 314 depending rearwardly and extending through rib 306. Leads 312 and 314 are protected from the surrounding fluid environment via a layer of potting compound 312 and are used to connect switch 310 and transducer 304 in parallel with signal receivers. Switch 310 is normally open but closes when it experiences a predetermined pressure corresponding to specified water depth at which point the signal from transducer 304 is shorted. Switch 310 resides inside of a tin plated brass front cap 316 that is soldered to the rear housing 302 and is provided with cutouts 318 that permit fluid to acoustically communicate with transducer 304. A forward plastic protective cover 324 is provided and is heat swaged over the front cap 316 to provide tamper resistance as well. A forward facing hole 324 is provided in protective cap 320, as well as cutouts 322, to permit fluid to be in contact with switch 310.

Those skilled in the art may make other changes to the invention without departing from the scope of its teachings. Therefore, it is intended that the embodiments described herein be considered as illustrative and not be construed in a limiting sense.

From the foregoing, it will be seen that the present invention provides a pressure-sensitive switch which can be manufactured economically and which is highly suitable for use in hydrophone cables, in that it is resistant to substantial over-pressure without adverse effects, and can be mounted so that it does not transmit substantial vibrations to the hydrophone adjacent which it is mounted.

What is claimed is:

1. A pressure-sensitive switch comprising:
   a base member having a mounting surface formed of electrically-insulating material;
   first and second electrodes mounted on said base member, each of said electrodes having an exposed, electrically-conductive contact surface disposed adjacent said mounting surface of said base member; and
   a flexible diaphragm having a peripheral portion fixedly secured in a substantially fluid-tight manner to said mounting surface and a central portion overlying said contact surfaces of said first and second electrodes, at least said central portion of said diaphragm being formed of electrically-conductive material, being exposed to the pressure surrounding said switch, and being formed with plural corrugations,
   such that when said switch is exposed to atmospheric pressure, said central portion of said diaphragm is spaced from said contact surfaces of said electrodes, but when said switch is exposed to a pressure substantially in excess of atmospheric pressure, said central portion of said diaphragm is forced into contact at a predetermined pressure with both said contact surfaces, thereby electrically connecting said first and second electrodes to each other.

2. A pressure-sensitive switch according to claim 1 wherein said diaphragm is substantially circular and said corrugations are substantially rotationally symmetric and concentric with said diaphragm.

3. A pressure-sensitive switch according to claim 1 wherein said peripheral portion of said diaphragm is provided with a flange which extends outwardly and away from said mounting surface, and wherein said diaphragm is secured to said mounting surface by solder fused at least in part between said flange and the adjacent portion of said mounting surface.

4. A pressure-sensitive switch according to claim 3 wherein said peripheral portion of said diaphragm is provided with a contact portion lying immediately radially inwardly of said flange, said contact portion lying flat against said mounting surface of said base member, and wherein said solder extends into contact with minimal thickness with said contact portion of said diaphragm.

5. A pressure-sensitive switch according to claim 1 wherein said diaphragm is secured to said mounting surface in a gas-tight manner so that a sealed, gas-tight chamber is formed between said diaphragm and said mounting surface.

6. A pressure-sensitive switch according to claim 5 wherein said gas-tight chamber contains gas at predetermined pressure.

7. A pressure-sensitive switch according to claim 1 wherein said diaphragm is formed from beryllium copper.

8. A pressure-sensitive switch according to claim 1 the surface of the diaphragm remote from said mounting surface of said base member is provided with a corrosion-resistant coating.

9. A pressure-sensitive switch according to claim 8 wherein said corrosion-resistant coating comprises a layer of nickel covered by a layer of gold.

10. A pressure-sensitive switch according to claim 9 wherein said layer of gold is at least in part covered by a layer of tin.

11. A pressure-sensitive switch according to claim 1 wherein said diaphragm is spaced from said first and second contacts by at least about 0.005 inch when said switch is exposed to atmospheric pressure.

12. A pressure-sensitive switch according to claim 11 wherein said diaphragm is spaced from said first and second contacts by about 0.010 inch when said switch is exposed to atmospheric pressure.

13. A pressure-sensitive switch according to claim 1 further comprising first and second conductors electrically connected to said first and second electrodes respectively and extending through said base member to points on the external surface of said base member spaced from said mounting surface.

14. A pressure-sensitive switch according to claim 13 wherein said base member has at least one wall defining at least one aperture extending through said base member, one end of said aperture opening through said mounting surface, and wherein at least one of said first and second conductors passes through said aperture.

15. A pressure-sensitive switch according to claim 14 further comprising a sealing member disposed in said aperture so as to prevent flow of gas along said aperture.

16. A pressure-sensitive switch according to claim 14 wherein the wall of said aperture is deformed so that part of said aperture is crimped shut.

17. A pressure-sensitive switch according to claim 1 wherein said first and second electrodes have the form of laminae mounted on the mounting surface.

18. A pressure-sensitive switch according to claim 1 wherein said first and second electrodes are movable relative to the mounting surface toward and away from the diaphragm.

19. A pressure-sensitive switch according to claim 18 wherein said first and second electrodes are each provided with a threaded extension, and wherein said base member is provided with walls defining two internally-threaded apertures into which said threaded extensions of said electrodes are movably received.

20. A method for adjusting the pressure setting of a pressure-sensitive switch according to claim 1, which method comprises exerting on said flexible diaphragm a pressure in excess of that required to force said central portion of said diaphragm into contact with both said contact surfaces, said pressure exerted being sufficient to cause a permanent, non-elastic deformation of said diaphragm and thereby change said pressure setting.

21. A method for adjusting and stabilizing the pressure setting of a pressure-sensitive switch according to claim 1, which method comprises the step of placing said switch under high temperature and moderate pressure to stress relieve it.

22. A method for adjusting the pressure setting of a pressure-sensitive switch according to claim 5, which method comprises changing the pressure of the gas within said gas-tight chamber formed between said diaphragm and said mounting surface.

23. A method according to claim 22 wherein said base member has at least one wall defining at least one aperture extending through said base member, and wherein said change in pressure of said gas is effected by introducing gas through said aperture into said gas-tight chamber, thereby changing the pressure within said chamber, and thereafter sealing said aperture in a gas-tight manner.

24. A method according to claim 23 wherein said sealing of said aperture is effected by introducing a sealing member into said aperture.

25. A method according to claim 23 wherein said sealing of said aperture is effected by crimping the wall of said aperture, thereby closing the aperture in a gas-tight manner.

26. In a sound pressure detection assembly comprising a sound pressure detector and a pressure-sensitive switch arranged to inactivate the sound pressure detector when the assembly is subjected to a pressure greater than a predetermined value, the improvement which comprises using as the pressure-sensitive switch a switch according to claim 1.

27. A sound pressure detection assembly according to claim 26 wherein the sound pressure detector comprises a hydrophone.

28. A sound pressure detection assembly according to claim 27 further comprising a vibration isolating member arranged to reduce transmission of vibration from said switch to said sound pressure detector of said hydrophone.

29. A sound pressure detection assembly according claim 28 wherein said hydrophone is substantially cylindrical and said switch is disposed adjacent one end face of said cylindrical hydrophone but is not affixed to said end face, and wherein said vibration isolating member comprises a cap having an end plate and a skirt depending from the periphery of said end plate, said end plate overlying said switch and having walls defining an aperture extending through said end plate, so that the pressure external to said assembly is transmitted through said aperture to the diaphragm of said switch, and said skirt extending around, and being secured to, the portion of said substantially cylindrical hydrophone adjacent said switch.

30. A vibration-detection assembly according to claim 27 wherein said hydrophone is substantially cylindrical and said switch is disposed adjacent the cylindrical side wall of said hydrophone.

31. A vibration-detection assembly according to claim 27 wherein said hydrophone has a transducer comprising:
    an elongate chamber having at least one open end to allow fluid to flow into the chamber,
    a piezoelectric sensor mounted inside the chamber, the sensor having faces defined by edges, and
    wicking material inside the chamber between the sensor and the chamber, for wicking fluid into the chamber.

32. A vibration-detection assembly according to claim 27 wherein said hydrophone comprises:
    a. a substantially cylindrical casing;
    b. an electrically conductive support element within the casing, the support element defining a sound conductive channel through the support element, wherein the casing and the support element define a volume therebetween;
    c. a piezoelectric crystal on the support element outside the channel, the crystal defining a first surface in contact with the support element and a second surface opposite the support element;
    d. a first output terminal of the transducer electrically coupled to the support element; and
    e. a second output terminal of the transducer electrically coupled to the second surface.

33. A vibration-detection assembly according to claim 27 wherein said switch is arranged to inactivate said hydrophone when the assembly is subjected to a pressure greater than that exerted by about 35 meters of water.

34. In a hydrophone cable assembly comprising:
    a waterproof hollow elongate prismatic sheath;
    at least one tensile member fixedly secured to said sheath;
    a plurality of hydrophones disposed within the hollow interior of said sheath at spaced intervals therealong;
    signal transmission means for transmitting signals from said plurality of hydrophones to one end of said sheath; and
    at least one pressure-sensitive switch arranged to inactivate said hydrophones when the hydrophone cable assembly is subjected to a pressure greater than a predetermined value, the improvement which comprises using as said at least one pressure-sensitive switch at least one switch according to claim 1.

35. A hydrophone cable assembly according to claim 34 wherein said at least one switch is arranged to inactivate said hydrophones when the assembly is subjected to a pressure greater than that exerted by about 35 meters of water.

* * * * *